United States Patent [19]

Giuseppe

[11] Patent Number: 4,931,301

[45] Date of Patent: Jun. 5, 1990

[54] PROCESS FOR MAKING VARIOUSLY SHAPED WAFFLE PRODUCTS, ESPECIALLY HAVING A CONE OR SIMILAR SHAPE, FOR ICECREAMS AND FOODS

[75] Inventor: Bianchi Giuseppe, Milano, Italy

[73] Assignee: Scriba S.p.A., Milan, Italy

[21] Appl. No.: 240,552

[22] Filed: Aug. 8, 1988

[30] Foreign Application Priority Data

Jul. 6, 1988 [IT] Italy .............................. 212528 A/88

[51] Int. Cl.⁵ .......................................... A21D 15/00
[52] U.S. Cl. .................................... 426/505; 426/391; 426/512; 426/523; 426/414; 99/383; 249/122
[58] Field of Search .............. 426/391, 496, 505, 512, 426/523, 95, 413, 414; 99/426, 372, 383; 249/122, 124, 125

[56] References Cited

U.S. PATENT DOCUMENTS 143,564 10/1873 Fitch ...................................... 99/372
4,303,690 12/1981 Haas, Sr. et al. .................... 426/391

FOREIGN PATENT DOCUMENTS 240309 10/1964 Austria .
3387 7/1883 United Kingdom .................. 99/372

OTHER PUBLICATIONS

DeGouy, L., The Gold Cookbook, 1978, Chilton Book Company, Radnor, Pa., pp. 864, 865 and 869.

Primary Examiner—Donald E. Czaja
Assistant Examiner—H. Pratt
Attorney, Agent, or Firm—Browdy and Neimark

[57] ABSTRACT

A process for producing variously shaped waffle products, especially waffle products having a conical or similar shape for icecream and foods comprises a step of introducing batter between dies and counterdies having a high thermal conductivity, cooking batter by heating dies and counterdies by hot air, and extracting the waffle obtained by cooking the batter when the waffle is at a temperature at which its shape is substantially stable.

2 Claims, 2 Drawing Sheets

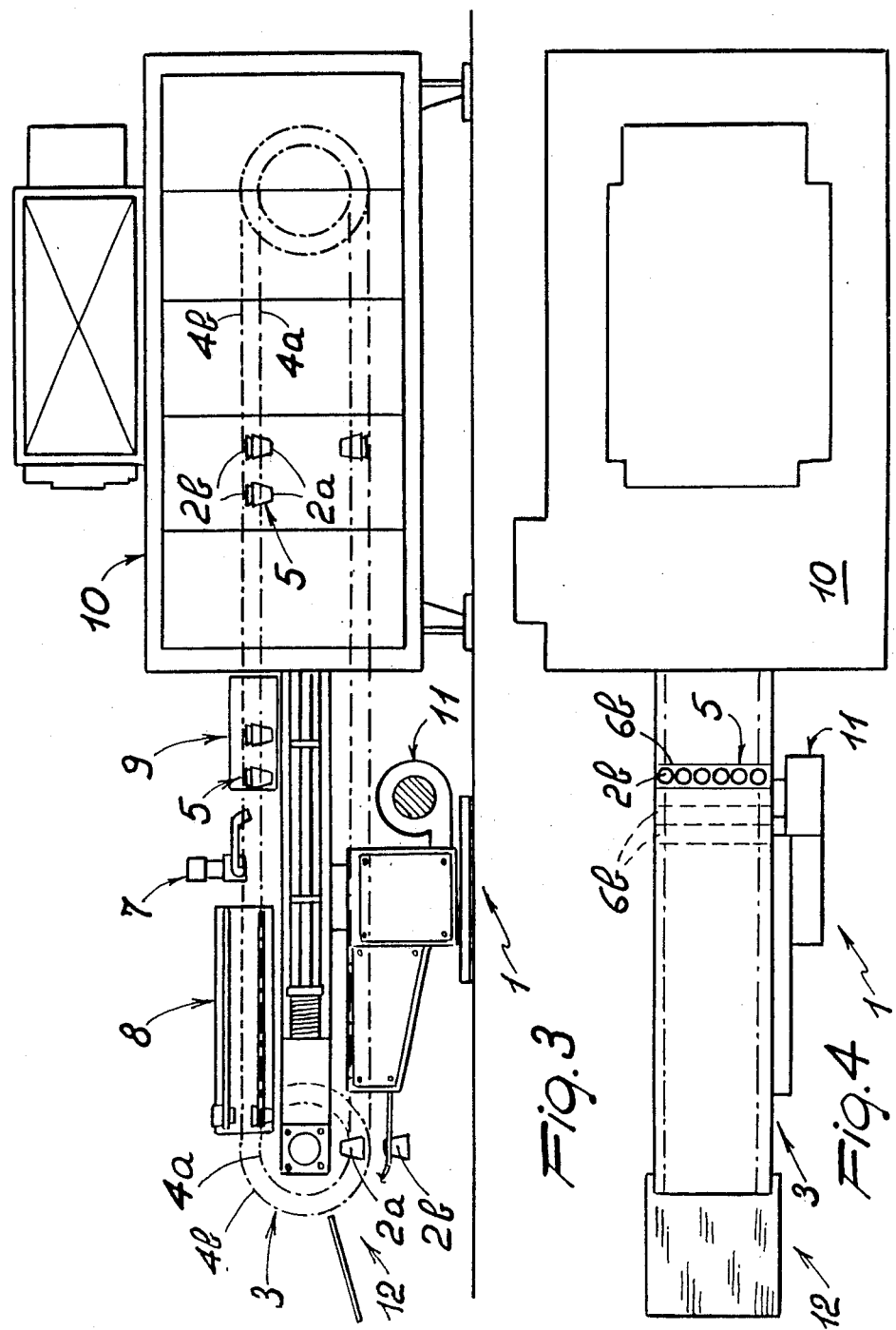

PROCESS FOR MAKING VARIOUSLY SHAPED WAFFLE PRODUCTS, ESPECIALLY HAVING A CONE OR SIMILAR SHAPE, FOR ICECREAMS AND FOODS

BACKGROUND OF THE INVENTION

The present invention is related to a process and apparatus for making waffle products of various shapes, especially having a cone or similar shape for ice cream and foods. It is known that the waffle products most widely consumed are in the form of a creamy dough that is called a batter, before cooking, while after cooking they exhibit a well defined shape or a precise preset thickness.

To achieve said preset thickness, which is especially important in the case of ice cream waffles having a conical or similar shape, cooking is to be carried out in the gap between a die and counterdie, the heat being delivered by application of direct flame to said dies or by embedding electric resistances in the dies.

Particularly for making cone shaped ice cream waffles, essentially two different processes have been used up to now, each one requiring a specific device.

A first process can be used for producing waffles that, due to their composition, are soft at the end of the cooking process. The first step of said process is to make a flat waffle by cooking said batter between a flat plate and counterplate.

Heat sources, for example burner flames, are directly applied on to the closed plates for the time needed to cook the batter and transform it into a waffle layer. The plates perform therefore as real cooking unit.

The soft cooked waffle is subjected while hot to the final shaping operation, for example by winding it on a suitable mould. During shaping, the waffle cools down and gradually sets, finally keeping the imposed shape.

Said first process is used to make high quality waffles from a batter having a sugar content as high as 40%, by weight and higher, based on the weight of flour. In fact, just sugar is the main cause of waffles not setting during cooking and of the need that they be intensively cooled to achieve stable shapes.

By means of the first process above, cones and cups having a specially pleasant taste are therefore obtained. The high sugar rate also has the merit of imparting to the waffles better friability and good impermeability and resistance to absorbing liquids.

A second process is addressed to the production of cones and similar shapes from a batter that, due to its composition, sets during cooking, thus giving rise to waffles the shape of which is already stable even when hot. This process comprises the steps of delivering the batter between die and counterdie, said die and counterdie having any shape, and of delivering heat to the moulds by means of burner flames.

These moulds too, like the above-mentioned plates, perform the double function of real moulds and cooking ovens. In fact, said moulds in some cases comprise electric resistances for the production of heat, said electric resistances being embedded in said moulds.

For the shape to be stable at the moment it is extracted from the moulds, the batter should not contain more than 20 weight % sugar based on the flour component. A percent of about 20% is enough for the waffle to be dangerously soft and capable of being deformed at the moment it is taken out of the moulds, thus giving rise to possible deformation. Said second process, though it makes only possible to produce lower quality waffle products, allows nevertheless the production, by means of said moulds, of ice cream waffles having various different conical and similar shapes. This process has therefore widely spread. The above methods have some important drawbacks. To assure the necessary uniform cooking, both of the above-mentioned processes require that plates or dies having a high thermal inertia, that is a heavy mass, be used.

The heavy mass is necessary for the heat delivery to the waffles to be rendered uniform in every point, for the flames to be kept as displaced as possible, and for the temperature to be kept as constant as possible. But the heavy mass of the plate and die brings about their high cost, thus hindering a frequent renewal of the shape of the waffles.

The cost of the plates and dies is a considerable one also due to the fact that the same, being subject to temperatures of more than one thousand degrees centigrades on the flame-facing side, have to be so built as not to be heat-deformed. The direct application of the heat sources causes then the cooking to be non-accurate and difficult, evidently due to the violence of the applied heating and to the fact that said heating can change continuously due both to changes of burner efficiency and to very small variations of the time during which the burner flame is applied.

Moreover, an intensive thermal dispersion and a corresponding heat waste are produced. In fact, the heat that is not absorbed by the plate is given off to the environment thus becoming useless.

A typical drawback of the first process is a certain complexity of the steps of taking the waffle out of the plates and successively hot-shaping said flat waffle. Moreover—and most important—the first process does not allow one to produce conical and similar waffles having a complex or fantasy shape that would stimulate the interest of consumers, for example of a shape having a plurality of different coves or cavities, said coves or cavities being adapted to receive different qualities of ice cream.

The second process allows shapes of whatever kind to be obtained, but the employed waffle is one of a lower quality and taste due to the low sugar content.

It never appeared to be possible to unify the above processes to possibly obtain high quality waffles the shape of which could at the same time be freely chosen. In fact, if the known processes were used for cooking in moulds a batter having a high sugar content, very high costs due to heat waste would ensue at every production cycle: the mould temperature must be reduced from the cooking temperature, which is markedly higher than 200 degrees centigrade, to a temperature of about 100 degrees centigrade, that is more than halved, for the waffles having a sugar content higher than 20% to become firm enough for them to be demoulded without the occurrence of deformation.

Due to the high thermal inertia of the mould, non unacceptable times would ensue for cooling down and heating again said moulds, giving rise to excessively and abnormally long production time and unsustainable costs.

SUMMARY OF THE INVENTION

In the above situation, the technical aim underlying the present invention is to create a process and apparatus by means of which the above-mentioned drawbacks can be substantially overcome.

Said technical aim is achieved by a process for producing waffle products variously shaped, in particular cone-shaped and similar waffles for ice cream and foods, characterized in that it comprises the steps of:

introducing batter between dies and counterdies, said dies and counterdies having the shape of the products that are to be attained and being of a high thermal conductivity, cooking said batter by heating said dies and counterdies by means of hot air, and taking out of said dies and counterdies the waffle obtained by cooking said batter when said waffle is at a temperature at which its shape is substantially stable. Said process is brought about by means of an apparatus which is characterized in that it comprises:

a plurality of dies and counterdies, said dies and counterdies having a thin wall thickness and being made of a material having a low specific heat and a high thermal conductivity, a station for the delivery of a meterable amount of batter, said batter being delivered into the gap between said dies and counterdies, a cooking oven, said cooking oven being adapted to deliver heat in a uniform way to said dies and counterdies and comprising a hot-air cooking chamber, said chamber being adapted to reach an internal temperature that is at least the same as the cooking temperature of said batter, and a station for the extraction of waffle products from said dies and counterdies.

BRIEF DESCRIPTION OF THE DRAWINGS

In the following description of a preferred embodiment of the invention, reference is made to the accompanying drawings, in which:

FIG. 3 is an elevation view of the apparatus that carries out the process of FIG. 2;
and
FIG. 4 is a top plan view of the apparatus of FIG. 3.

DESCRIPTION OF THE PREFERRED EMBODIMENT

Figure 1:
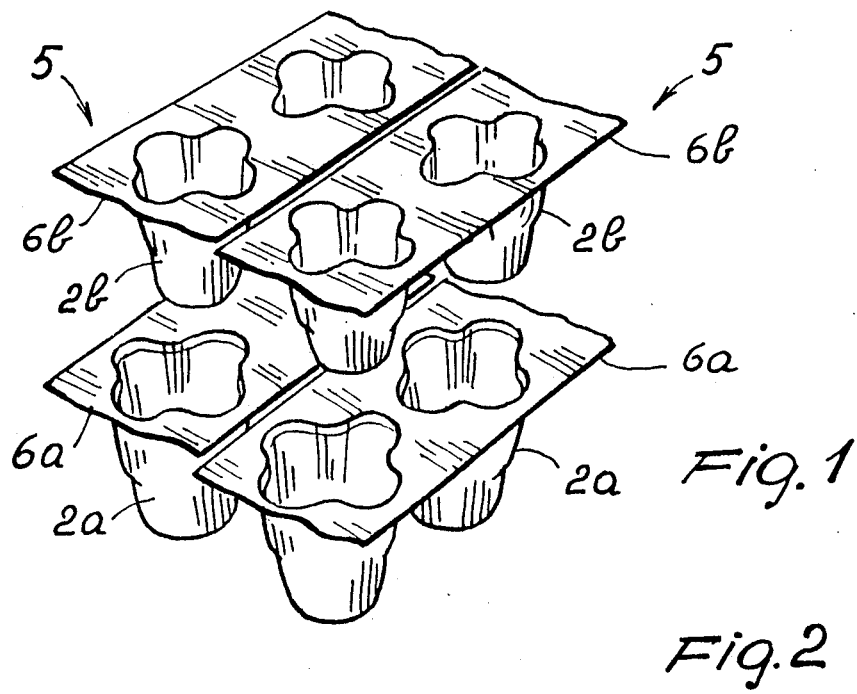
FIG. 1 schematically shows the moulds that are used.

The details of process of the invention are as follows. In a step of the process shown at 1a in FIG. 2, fluid batter is introduced between a die 2a and counterdie 2b. Die 2a is only partially filled with batter while counterdie 2b is raised above said die.

Then, in the next step, shown at 1b, said die and counterdie are brought into engagement with one another by inserting counterdie 2b into die 2a. In this situation, the batter is already forced to substantially take an arrangement similar to the shape of the waffle product 13 to be obtained.

Die 2a and counterdie 2b only have the purpose of shaping the batter and not of influencing its cooking. On the contrary, they are absolutely unsuitable for rendering the cooking heat gradual or uniform should it be delivered in an irregular or non uniform way. In fact, dies 2a and counterdies 2b are provided that are very thin and exhibit a high thermal conductivity.

The cooking heat is suitably supplied during a step of the process that immediately follows and that is shown at 1c, said cooking heat being delivered from a source that already has a uniform temperature and acts in a diffused way, namely hot air having a temperature that is near and preferably higher than the cooking temperature of the batter.

Die 2a and counterdie 2b are actually introduced into a hot air environment, said hot air delivering the calories that are needed to cook the batter and cause it to become a waffle.

The advantages that are obtained by combining hot air cooking and thin moulds are important. In fact, an extremely gradual cooking is obtained, by means of which any burning is avoided. Even in the case of an inaccurate operation of the involved devices, cooking is not compromised: little deviations from the optimum cooking parameters have no determinant influence on cooking. In the case of a low-sugar waffle having a sugar content of 20 weight % based on the weight of flour, the waffle can even be taken out as soon as it is cooked, immediately after the step shown at 1c, outside of said hot air environment.

Figure 2:
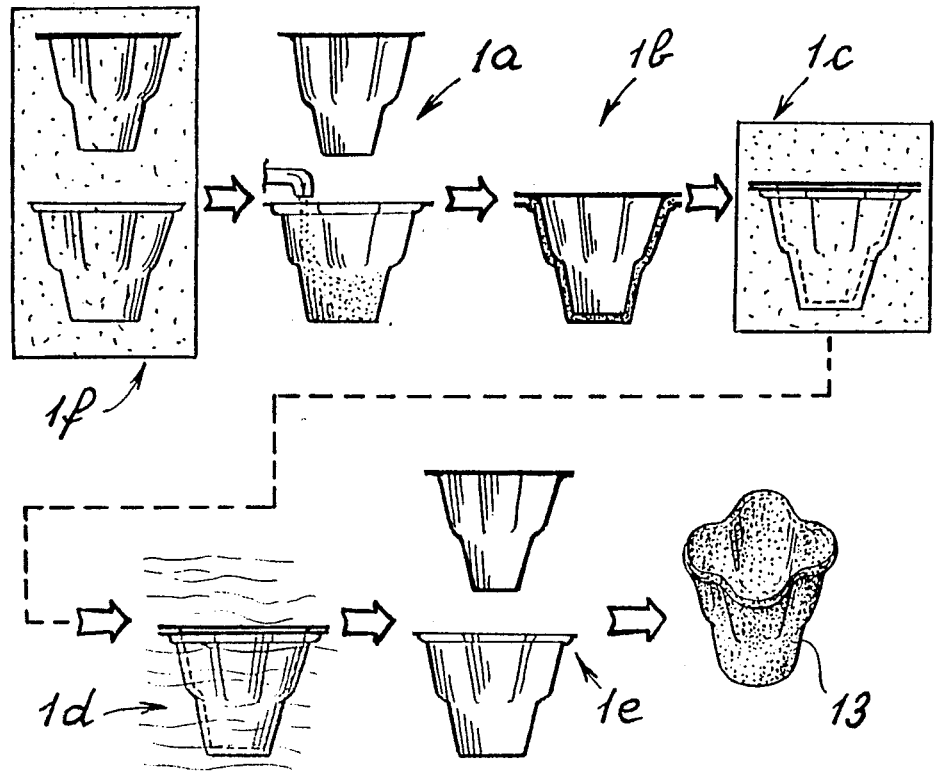
FIG. 2 shows the various steps of the process.

The high quality waffles, having a sugar content of from about 20% to more than 40% based on the weight of flour, need on the contrary a further cooling step that is shown at 1d in FIG. 2. Said cooling-down step is carried out while the waffle, which is already cooked but still soft, is contained between die 2a and counterdie 2b. Said cooling step may comprise a simple stay of die and counterdie at room temperature, optionally under ventilation.

It is however necessary to bring the waffle from a temperature higher than 200 degrees centigrade to a temperature that can even be lower than 100 degrees centigrade.

It is to be pointed out that during this cooling step the wasted heat is almost only the heat of the waffle to be cooled down, as the amount of heat that is stored by die 2a and counterdie 2b is very low due to their low thickness and high conductivity. The usable heat remains in the hot air that is inside the oven and this air is not wasted or subjected to cooling processes, not even partial ones.

When the waffle reaches a temperature at which the shape stability of same is assured, the final step 1e, comprising the separation of counterdie 2b from die 2a and the extraction of the waffle product 13, is performed.

According to the invention, it is also possible to provide, only for die 2a and counterdie 2b an initial step 1f, in which said dies and counterdies are preheated to the cooking temperature for the batter to be introduced, during said step 1a, into an environment already having a suitable temperature.

The initial preheating can be carried out in whatever way with no special precautions since it is carried out with no batter inside.

The apparatus by means of which the above-explained process is brought about is indicated by numeral 1 in FIGS. 3 and 4. It comprises a conveyor 3, said conveyor comprising internal chains 4a and external chains 4b, said chains running along a closed-path working line, said working line having two major straight lengths, said major lengths being superposed to one another, and two terminal lengths, said terminal lengths running along a circular arc. Chains 4a and 4b are substantially parallel to one another and have a dragging function.

In fact, said chains drag shaping units 5 (FIG. 1), each of said shaping units comprising a couple or bands of lists, said bands of lists being superposed to one another, and adapted to be moved to approach to one another, and dies and counterdies, said dies and counterdies being respectively shaped like a die and punch.

In particular, in each shaping unit 5 an internal list 6a and an external list 6b can be seen, said list being respectively integral with dies 2a and counterdies 2b, that are aligned along the longitudinal direction of the respective lists. The lists 6a, 6b are arranged transversally relative to the running direction of chains 4a, 4b.

Dies and counterdies are made of metal, for example stainless steel, have a very low thickness, weight and specific heat, and exhibit a high thermal conductivity. The conveyor 3 is also provided with guide slides, said slides specifically determining the reciprocal approaching/removing motion of bands 6a, 6b and, respectively, dies 2a and counterdies 2b.

Along the upper straight length of conveyor 3 a batter delivery station 7 is provided, said batter delivery station being suitable to supply a meterable amount to dies 2a after said dies 2a and counterdies 2b have been preheated at a preheating station 8.

This preheating station is located at the beginning of said straight length inside a closed environment in which dies and counterdies are heated by means of infrared radiation. As an alternative, at the preheating station 8 burners can be provided that carry out a direct heating of dies and counterdies.

Down hill of the delivery station 7 and following area 9 where said slides approach to one another thus bringing about the introduction of counterdies 2b in their corresponding dies 2a, a cooking oven is provided, said cooking oven comprising a hot-air cooking chamber 10, said hot air supplying the heat for cooking the batter. The temperature of the hot air is at least equal to the cooking temperature of batter, and preferably it is higher than that and is of about 300 degrees centigrade. At the exit of the cooking chamber 10 a cooling station 11 is provided, said cooling station being adapted to blow cold air or air having room temperature onto the shaping units 5 and the waffles they contain.

Next, an extraction station 12 is provided in which the counterdies 2b are removed from dies 2a, in said extraction station the waffle products being discharged.

The operation of the apparatus is as follows.

The shaping units 5, after they have been preheated in the preheating unit 8, are supplied with batter at the delivery station 7, the counterdies 2b being rised above dies 2a. Counterdies 2b are then lowered to approach dies 2a for the batter to get the shape of the products to be produced. Next, the shaping units 5 enter the cooking chamber 10 where the circulated hot air supplies an amount of calories that are enough to completely cook the batter. Due to the features of the dies 2a and counterdies 2b, especially their high thermal conductivity and low thickness, cooking is carried out in a uniform way and in short time.

After cooking, should the waffle still be soft due to its high sugar content it is cooled down in the cooling station 11.

After reaching the necessary dimensional stability, the waffle is taken out of dies and counterdies at the extraction station 12.

The conveyor 5 is provided with long straight lengths that can be used by the different operation stations, the circular arc parts of said conveyor being of no hindrance as dies and counterdies are aligned on lists 6a, 6b that are arranged transversally to conveyor 3.

The apparatus according to the present invention allows important advantages to be achieved. In fact:

it allows the position and length of the operating stations to be freely provided along the running path of the moulds and to freely choose the conveyor dimensions and, consequently, also the working rate;

it can be readily set up as the moulds are subject to relatively moderate temperatures;

can be easily driven due to light weight of the moulds;

uses low cost moulds since the moulds have a low thickness and can be made with materials of various kind;

its operating costs are reduced because the heat is almost completely conserved in the cooking chamber;

its apparative costs are reduced as it is composed of parts that are relatively simple.

Especially, the apparatus of the present invention allows the obtainment of waffle products that can even have a high sugar content and provided with complex shapes having said shapes imparted directly within the moulds. The very simple and low costs moulds are an important feature in making it possible said moulds to be substituted in any moment with other, differently shaped moulds, for example to follow the fashion shapes or to induce a whish into the consumers by means of new shapes.

I claim:

1. A cyclic process for producing variously shaped waffle products, especially waffle products with a conical or similar shape for ice cream and foods, comprising introducing fluid batter having a sugar content of more than 20% between thin dies and counterdies having the shape of the products to be obtained, said thin dies and counterdies exhibiting a low thermal inertia when compared to the thermal inertia of said waffle products and a high thermal conductivity and having only the function of shaping said fluid batter;

introducing said thin dies and counterdies and said batter into a hot air environment containing hot air having a substantially uniform temperature;

cooking said batter by uniformly heating said thin dies and counterdies by means of said hot air, said hot air uniformly and mainly delivering through said thin dies and counterdies the heat to cook said batter and form hot waffles between said thin dies and counterdies;

extracting said dies and counterdies from said hot air environment;

cooling the waffles while they are outside of said hot air and still contained between said thin dies and counterdies wherein the amount of heat stored in said waffle is almost all of the waste heat in cooling because said dies have low thickness and high thermal conductivity;

and extracting said waffles from said dies and counterdies when said waffles are at a temperature at which their shape is substantially stable;

in each cycle of the process the spent heat being mainly the heat stored by said waffles.

2. A cyclical process for producing shaped waffle products, especially waffle products with a conical or similar shape for ice cream and foods, comprising:

quickly preheating thin dies and counterdies having the shape of the products to be obtained and exhibiting a low thermal inertia when compared to the thermal inertia of said waffle product and a high thermal conductivity;

introducing fluid batter having a sugar content or more than 20% in said dies, while said counterdies are raised above said dies;

engaging said counterdies with said dies and forcing said fluid batter to substantially take an arrangement similar to the final shape of the products to be obtained;

introducing said thin dies and counterdies and said batter into a hot air environment containing hot air having a substantially uniform temperature;

cooking said batter by uniformly heating said thin dies and counterdies by means of said hot air, said hot air uniformly and mainly delivering, through said thin dies and counterdies, the heat to cook said batter and form waffles;

extracting said dies and counterdies from said hot air environment;

cooling the waffles while they are outside of said hot air and still contained between said thin dies and counterdies wherein the amount of heat stored in said waffle is almost all of the waste heat in cooling because said dies have low thickness and high thermal conductivity;

disengaging said counterdies from said dies;

and extracting said waffles from said dies and counterdies when said waffles are at a temperature at which their shape is substantially stable;

in each cycle of the process the spent heat being mainly the heat stored by said waffles.

* * * * *

UNITED STATES PATENT AND TRADEMARK OFFICE
CERTIFICATE OF CORRECTION

PATENT NO. : 4,931,301
DATED : June 5, 1990
INVENTOR(S) : Guiseppe BIANCHI It is certified that error appears in the above-identified patent and that said Letters Patent is hereby corrected as shown below:

On the face of the Patent:

United States Patent [19]    Delete "Giuseppe", insert therefor -- Bianchi --

[75] Inventor:    Delete "Bianchi Giuseppe", insert therefor -- Giuseppe BIANCHI --

Signed and Sealed this

Seventeenth Day of December, 1991

*Attest:*

HARRY F. MANBECK, JR.

*Attesting Officer*    *Commissioner of Patents and Trademarks*